US012692191B2

(12) United States Patent
Azuma et al.

(10) Patent No.: US 12,692,191 B2
(45) Date of Patent: Jul. 28, 2026

(54) METHOD FOR MANUFACTURING ANNULAR GLASS SUBSTRATE, ANNULAR GLASS SUBSTRATE, AND METHOD FOR MANUFACTURING GLASS SUBSTRATE FOR MAGNETIC DISC

(71) Applicant: HOYA CORPORATION, Tokyo (JP)

(72) Inventors: Shuhei Azuma, Hung Yen Province (VN); Toshio Takizawa, Tokyo (JP)

(73) Assignee: HOYA CORPORATION, Tokyo (JP)

( * ) Notice: Subject to any disclaimer, the term of this patent is extended or adjusted under 35 U.S.C. 154(b) by 24 days.

(21) Appl. No.: 18/553,300

(22) PCT Filed: Mar. 31, 2022

(86) PCT No.: PCT/JP2022/016768
§ 371 (c)(1),
(2) Date: Sep. 29, 2023

(87) PCT Pub. No.: WO2022/211074
PCT Pub. Date: Oct. 6, 2022

(65) Prior Publication Data
US 2024/0174556 A1 May 30, 2024

(30) Foreign Application Priority Data
Mar. 31, 2021 (JP) ................................. 2021-060849

(51) Int. Cl.
*C03C 15/02* (2006.01)
(52) U.S. Cl.
CPC .......... *C03C 15/02* (2013.01); *C03C 2203/50* (2013.01)

(58) Field of Classification Search
CPC ...... C03C 15/02; C03C 2203/50; C03B 33/04
See application file for complete search history.

(56) References Cited

U.S. PATENT DOCUMENTS

| | | | |
|---|---|---|---|
| 2015/0136743 A1 | 5/2015 | Hosseini | |
| 2015/0165548 A1* | 6/2015 | Marjanovic | C03B 33/091 |
| | | | 219/121.73 |

(Continued)

FOREIGN PATENT DOCUMENTS

| | | |
|---|---|---|
| JP | 2015-129076 A | 7/2015 |
| JP | 2018-526312 A | 9/2018 |
| WO | 2020/022510 A1 | 1/2020 |

OTHER PUBLICATIONS

Translation of the International Search Report mailed on Jun. 21, 2022.

*Primary Examiner* — Christopher T Schatz
(74) *Attorney, Agent, or Firm* — Spencer Fane LLP

(57) ABSTRACT
A method for manufacturing an annular glass substrate includes: forming, on a glass blank, a separation line that includes a plurality of defects along a predetermined circle by irradiating a surface of the glass blank with a laser beam along the circle; and separating a portion outside the separation line of the glass blank on which the separation line was formed from a portion inside the separation line by heating the portion outside the separation line at a higher temperature than the portion inside the separation line. The separation line includes: a first region in which the defects are periodically formed and an interval between a pair of adjacent defects is a first interval; and a second region in which an interval between a pair of adjacent defects is shorter than the first interval.

18 Claims, 8 Drawing Sheets

(56)  References Cited

U.S. PATENT DOCUMENTS

| 2018/0134606 | A1 | 5/2018 | Wagner et al. |
| 2021/0230042 | A1 | 7/2021 | Azuma |
| 2023/0141696 | A1 | 5/2023 | Wagner et al. |
| 2024/0425403 | A1 | 12/2024 | Azuma |

* cited by examiner

METHOD FOR MANUFACTURING ANNULAR GLASS SUBSTRATE, ANNULAR GLASS SUBSTRATE, AND METHOD FOR MANUFACTURING GLASS SUBSTRATE FOR MAGNETIC DISC

CROSS-REFERENCE TO RELATED APPLICATIONS

This is a U.S. National stage application of International Patent Application No. PCT/JP2022/016768, filed on Mar. 31, 2022, which, in turn, claims priority to Japanese Patent Application No. 2021-060849, filed in Japan on Mar. 31, 2021. The entire contents of Japanese Patent Application No. 2021-060849 are hereby incorporated herein by reference.

BACKGROUND

Field of the Invention

The present invention relates to a method for manufacturing an annular glass substrate in which an annular glass substrate is manufactured through shape processing using a laser beam, an annular glass substrate manufactured using this manufacturing method, and a method for manufacturing a glass substrate for a magnetic disc.

Background Information

Nowadays, hard disk apparatuses for recording data are used in personal computers, laptops, DVD (Digital Versatile Disc) recording apparatuses, data centers for cloud computing, and the like. A magnetic disk obtained by providing a magnetic layer on a glass substrate for a magnetic disk, which is an annular non-magnetic body, is used in a hard disk apparatus.

Conventionally, a technique for separating an annular glass substrate from a glass blank in such a method for manufacturing a glass substrate for a magnetic disc is known (WO 2020/022510). In this technique, first, defects are formed along a predetermined ring shape by irradiating a surface of a glass blank from which a glass substrate is to be formed with a laser beam along the predetermined ring shape. Thus, an outer portion located outside the predetermined ring shape and an inner portion located inside the predetermined ring shape are formed on the surface of the glass blank. Then, the outer portion of the glass blank is heated at a higher temperature than the inner portion to cause the outer portion of the glass blank to thermally expand relatively largely compared to the inner portion, so that a gap is formed between the outer portion and the inner portion. As a result, the outer portion and the inner portion of the glass blank can be separated from each other.

SUMMARY

However, with the technique described above, even when the outer portion of the glass blank is heated at a higher temperature than the inner portion, there are cases where no gap is formed between the outer portion and the inner portion, and thus the outer portion and the inner portion cannot be separated from each other. Also, even when a gap is formed between the outer portion and the inner portion and the outer portion and the inner portion can be separated from each other, there are cases where chipping occurs on at least a portion of an edge surface of the outer portion and an edge surface of the inner portion.

The present invention was achieved in order to solve the aforementioned problems, and it is an object thereof to provide a technique with which an annular glass substrate can be reliably separated from a glass blank in a method for manufacturing a glass substrate for a magnetic disc.

A first aspect of the present invention provides a method for manufacturing an annular glass substrate, including:

forming, on a glass blank, a separation line that includes a plurality of defects along a predetermined circle by irradiating a surface of the glass blank with a laser beam along the predetermined circle; and separating a portion outside the separation line of the glass blank on which the separation line is formed from a portion inside the separation line by heating the portion outside the separation line at a higher temperature than the portion inside the separation line, wherein the separation line includes: a first region in which the defects are periodically formed and an interval between a pair of adjacent defects is a first interval; and a second region in which an interval between a pair of adjacent defects is shorter than the first interval.

The method for manufacturing an annular glass substrate according to the first aspect of the present invention may be configured such that a length of the second region is 12.5% or less of a length of a circumference of the predetermined circle.

The method for manufacturing an annular glass substrate according to the first aspect of the present invention may be configured such that the interval shorter than the first interval is 70% or less of the first interval.

The method for manufacturing an annular glass substrate according to the first aspect of the present invention may be configured such that a circumferential length of the predetermined circle is not an integral multiple of the first interval.

The method for manufacturing an annular glass substrate according to the first aspect of the present invention may be configured such that the method further includes forming, inside the separation line on the glass blank, a second separation line that includes a plurality of defects along a second circle that is concentric with the predetermined circle and has a shorter diameter than the predetermined circle by irradiating the surface of the glass blank with a laser beam along the second circle, wherein the second separation line includes: a third region in which the defects are periodically formed and an interval between a pair of adjacent defects is a second interval; and a fourth region in which an interval between a pair of adjacent defects is shorter than the second interval, and the second interval is shorter than the first interval.

The method for manufacturing an annular glass substrate according to the first aspect of the present invention may be configured such that the separation line is formed by performing irradiation with the laser beam along a distance longer than one lap of the predetermined circle at a constant cycle.

A second aspect of the present invention provides a method for manufacturing an annular glass substrate, including:

forming, on a glass blank, a separation line that includes a plurality of defects along a predetermined circle by irradiating a surface of the glass blank with a laser beam along the predetermined circle; and separating a portion outside the separation line of the glass blank on which the separation line is formed from a portion inside the separation line by heating the portion outside the separation line at a higher temperature than the portion inside the separation line, wherein the plurality of defects include: a plurality of first defects that are periodically formed at predetermined intervals on the predetermined circle; and at least one second defect that is located between a pair of adjacent first defects out of the first defects.

The method for manufacturing an annular glass substrate according to the second aspect of the present invention may be configured such that the separation line is formed by performing irradiation with the laser beam along a distance longer than one lap of the predetermined circle at a constant cycle.

The method for manufacturing an annular glass substrate according to the second aspect of the present invention may be configured such that the plurality of defects include a plurality of the second defects that are each located between a pair of adjacent first defects out of the first defects, and the plurality of second defects are periodically formed at the predetermined intervals through irradiation with the laser beam performed after the irradiation of the laser beam along one lap of the predetermined circle is performed.

The method for manufacturing an annular glass substrate according to the second aspect of the present invention may be configured such that a circumferential length of the predetermined circle is not an integral multiple of the predetermined interval.

A third aspect of the present invention provides a method for manufacturing an annular glass substrate, including:

forming, on a glass blank, a separation line that includes a plurality of defects along a predetermined circle by irradiating a surface of the glass blank with a laser beam along the predetermined circle; and separating a portion outside the separation line of the glass blank on which the separation line is formed from a portion inside the separation line by heating the portion outside the separation line at a higher temperature than the portion inside the separation line, wherein the plurality of defects are formed at predetermined intervals through irradiation with the laser beam performed along a distance longer than one lap of the predetermined circle at a constant cycle with a speed of a portion of the glass blank irradiated with the laser beam relative to the laser beam being kept constant, the plurality of defects include: a plurality of first defects formed through first-lap irradiation with the laser beam; and at least one second defect formed through irradiation with the laser beam performed after the first-lap irradiation, and the predetermined interval is determined such that the at least one second defect is formed at a position different from positions of the plurality of first defects.

The methods for manufacturing an annular glass substrate according to the first aspect, the second aspect, and the third aspect of the present invention may be configured such that the glass blank is a glass blank manufactured using an overflow downdraw method.

A fourth aspect of the present invention provides an annular glass substrate including:

two main surfaces; and an outer circumferential edge surface that connects outer edges of the two main surfaces, wherein the outer circumferential edge surface is provided with a plurality of grooves extending in a thickness direction of the annular glass substrate, a first region, and a second region, in the first region, the grooves are periodically formed and an interval between a pair of adjacent grooves is a first interval, and in the second region, an interval between a pair of adjacent grooves is shorter than the first interval.

The annular glass substrate according to the fourth aspect of the present invention may be configured such that a length of the second region is 12.5% or less of a length of the outer edge.

The annular glass substrate according to the fourth aspect of the present invention may be configured such that the interval shorter than the first interval is 70% or less of the first interval.

The annular glass substrate according to the fourth aspect of the present invention may be configured such that the annular glass substrate further includes an inner circumferential edge surface that is concentric with the outer circumferential edge surface and is formed inside the outer circumferential edge surface, wherein the inner circumferential edge surface is provided with a plurality of grooves extending in the thickness direction of the annular glass substrate, a third region, and a fourth region, in the third region, the grooves are periodically formed and an interval between a pair of adjacent grooves is a second interval, in the fourth region, an interval between a pair of adjacent grooves is shorter than the second interval, and the second interval is shorter than the first interval.

A fifth aspect of the present invention provides a method for manufacturing a glass substrate for a magnetic disc, including at least processing for polishing the main surfaces of the annular glass substrate according to the fourth aspect of the present invention.

With the present invention, an annular glass substrate can be more reliably separated from a glass blank in a method for manufacturing a glass substrate for a magnetic disc.

DETAILED DESCRIPTION OF THE EMBODIMENTS

Figure 1:
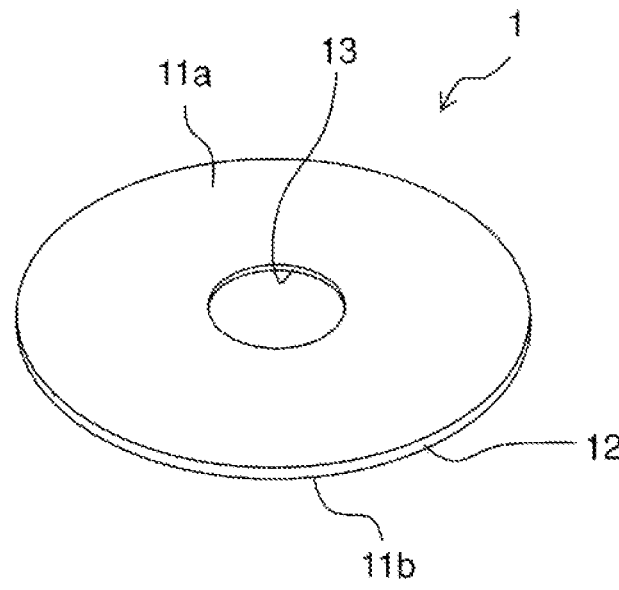
FIG. 1 is a perspective view of an annular glass substrate manufactured using a manufacturing method according to an embodiment of the present invention.

First, an annular glass substrate manufactured using a manufacturing method of this embodiment will be described with reference to FIG. 1.

A glass substrate 1 is a thin annular glass substrate in which a hole is coaxially formed at the center, and is used as, for example, a substrate for a magnetic disc. Although there is no limitation on the size of the glass substrate 1, the size is suitable for a magnetic disc with a nominal diameter of 2.5 inches or 3.5 inches, for example. A glass substrate for a magnetic disc with a nominal diameter of 2.5 inches has, for example, an outer diameter (diameter) of 55 to 70 mm, a central hole diameter (diameter: also referred to as an "inner diameter") of 19 to 20 mm, and a thickness of 0.2 to 0.8 mm. A glass substrate for a magnetic disc with a nominal diameter of 3.5 inches has, for example, an outer diameter of 85 to 100 mm, a central hole diameter of 24 to 25 mm, and a thickness of 0.2 to 0.8 mm.

The glass substrate 1 includes two main surfaces 11a and 11b that oppose each other, an outer circumferential edge surface 12, and an inner circumferential edge surface 13 that defines a central hole. The main surface 11a is an annular surface whose outer edge and inner edge form two concentric circles. The main surface 11b has the same shape as that of the main surface 11a, and is concentric with the main surface 11a. The outer circumferential edge surface 12 is a surface that connects the outer edge of the main surface 11a and the outer edge of the main surface 11b. The inner circumferential edge surface 13 is a surface that connects the inner edge of the main surface 11a and the inner edge of the main surface 11b. Note that a chamfered surface may be formed in the above-described connection portions. When a magnetic disc is manufactured using the glass substrate 1, magnetic layers are formed on the main surfaces 11a and 11b.

Figure 2:
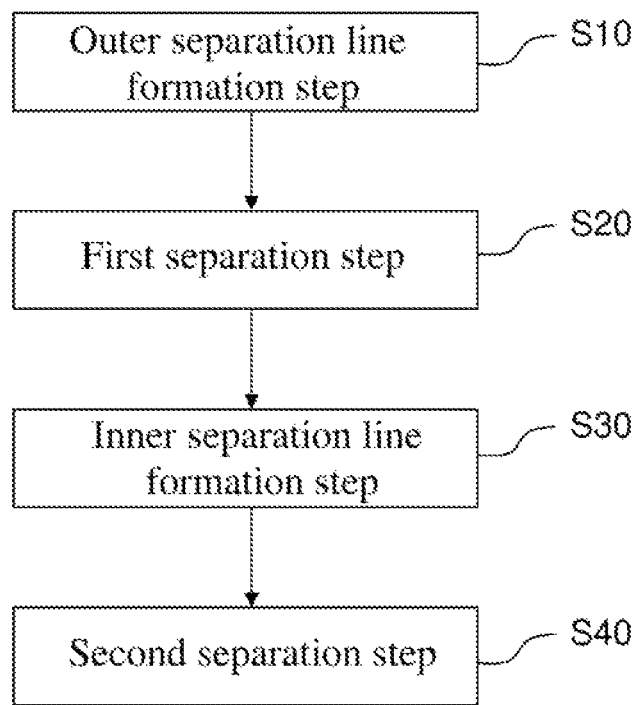
FIG. 2 is a flowchart showing a flow of a method for manufacturing an annular glass substrate according to an embodiment of the present invention.

Next, the flow of a method for manufacturing an annular glass substrate according to an example of this embodiment will be described with reference to FIG. 2. The method for manufacturing an annular glass substrate according to this embodiment includes an outer separation line formation step (S10), a first separation step (S20), an inner separation line formation step (S30), and a second separation step (S40).

In the outer separation line formation step (S10), a circular outer separation line that includes a plurality of defects is formed on a glass blank used as a material of the glass substrate 1 by irradiating the surface of the glass blank with a laser beam. In the first separation step (S20), a portion outside the outer separation line and a portion inside the outer separation line on the glass blank are separated from each other by heating the portion outside the outer separation line at a temperature higher than the temperature of the portion inside the outer separation line. Thus, a circular glass blank is taken out. In the inner separation line formation step (S30), a circular inner separation line that includes a plurality of defects is formed on the circular glass blank taken out in the first separation step S20 by irradiating the surface of the circular glass blank with a laser beam. In the second separation step (S40), a portion outside the inner separation line and a portion inside the inner separation line on the circular glass blank are separated from each other by heating the portion outside the inner separation line at a temperature higher than the temperature of the portion inside the inner separation line. Thus, an annular glass substrate is manufactured.

Next, the steps of the method for manufacturing an annular glass substrate according to an example of this embodiment will be described in detail with reference to FIGS. 3 to 12.

Figure 3:
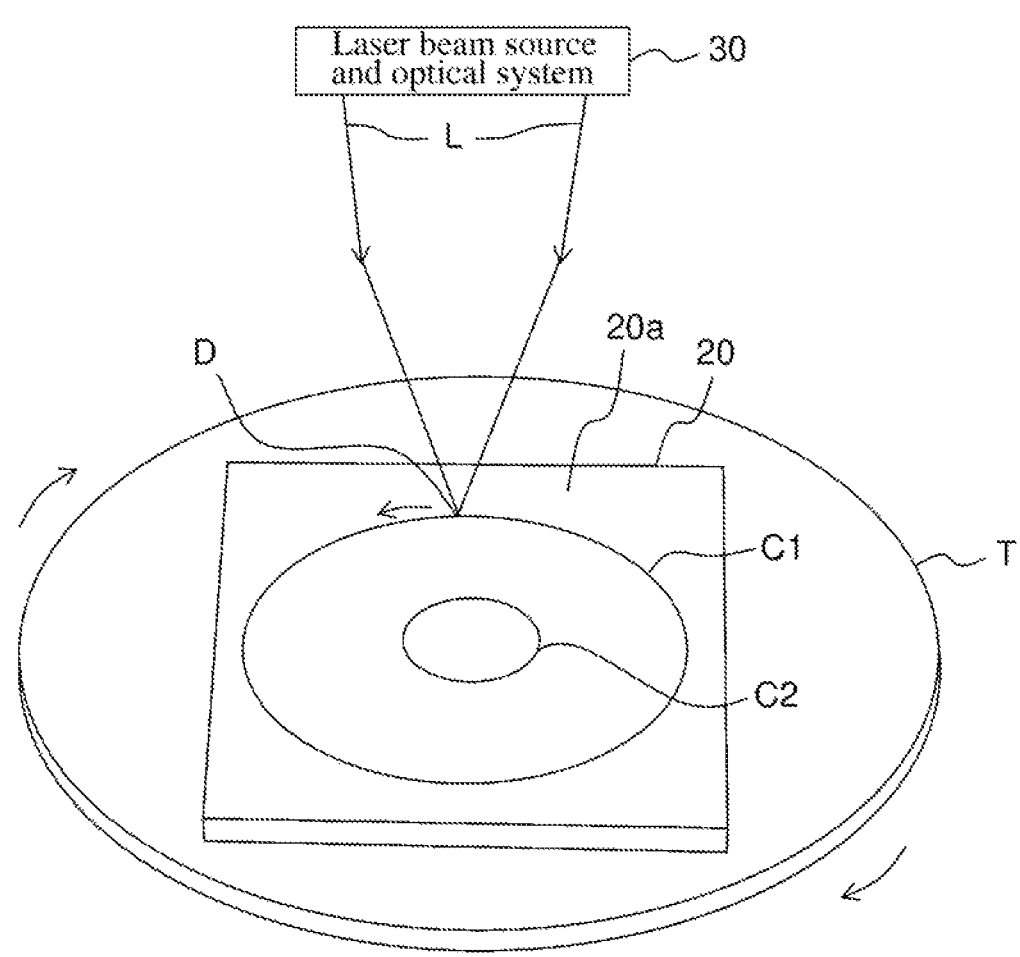
FIG. 3 is a diagram for illustrating irradiation with a laser beam in an outer separation line formation step.

In the outer separation line formation step (S10), as shown in FIG. 3, a glass blank 20 that is produced in advance and has a rectangular shape or the like is irradiated with a laser beam L.

Examples of the glass blank 20 used as a material of the glass substrate 1 include glass blanks made of aluminosilicate glass, soda-lime glass, borosilicate glass, and the like. In particular, amorphous aluminosilicate glass can be favorably used because it can be chemically strengthened as needed and it can be used to produce a glass substrate for a magnetic disc that has excellent substrate main surface flatness and substrate strength. The glass blank 20 is produced using, for example, a float method or an overflow downdraw method, and has a constant thickness. Alternatively, the glass blank 20 may be a glass plate obtained by molding a glass mass through press molding using a mold. Note that it is preferable to apply the present invention to a glass blank 20 produced using the overflow downdraw method. Although the reason for this is not entirely clear, one possible factor is that, in a large glass plate produced using the overflow downdraw method, differences in residual stress between in-plane positions are relatively large (i.e., residual stress in the in-plane direction varies relatively greatly). In the overflow downdraw method, molten glass is molded into a high-quality glass sheet by drawing the molten glass to a predetermined thickness while allowing the molten glass to fall vertically under gravity, and therefore, the longer the fall distance is, the taller the building needs to be. However, a tall building is technically difficult and expensive, and therefore, the fall distance is substantially limited. Accordingly, drawing and cooling of glass must be completed in a shorter distance compared with the float method, but the drawing and the cooling are parameters that influence the residual stress of molded glass, and therefore, residual stress in the in-plane direction varies greatly. If residual stress in the in-plane direction of a large glass plate varies greatly, residual stress will vary greatly between a plurality of glass blanks 20 formed by dividing the glass plate. Also, depending on the size of the glass blanks 20 formed by dividing the glass plate, in-plane residual stress may also vary greatly in one glass blank 20. The present invention is built on a premise that a separation line that includes intermittent defects is formed and cracks are formed between the plurality of defects, but it has been revealed that residual stress largely influences the formation of cracks. That is to say, cracks may be easy to form or be difficult to form depending on the magnitude or in-plane distribution of residual stress in the glass blank 20. Accordingly, there may also be a case where separation is successful in one glass blank 20, whereas separation fails in another glass blank 20. Therefore, even in the above-described cases where residual stress varies greatly between a plurality of glass blanks 20 and residual stress varies greatly in each glass blank 20, many glass blanks 20 can be stably separated without failure by applying the present invention to a glass blank 20 manufactured using the overflow downdraw method.

A laser beam source and optical system 30 is an apparatus for emitting a laser beam L, and examples thereof include solid lasers such as a YAG laser, a Yb:YAG laser, an Nd:YAG laser, a YVO laser, and an Nd:YVO laser. The wavelength of the laser beam can be set to be, for example, within a range of 1000 nm to 1100 nm. The laser beam L is a pulsed laser beam. In this embodiment, the pulse width of the laser beam L is preferably $10^{-10}$ seconds (100 picoseconds) or less. The light energy of the laser beam L can be adjusted as appropriate in accordance with the pulse width and the pulse width repetition frequency, and, for example, an average output during the irradiation time is 1 W or more. The frequency can be set to, for example, 1 kHz to 1000 kHz.

It is sufficient that a laser irradiation method is performed as follows: for example, the glass blank 20 is irradiated with the laser beam L using the laser beam source and optical system 30 with the laser beam L being adjusted as appropriate to be focused on the surface of the glass blank 20 or/and inside the glass blank 20. With such irradiation, at one point on a circle C1, the laser beam L is continuously focused in the thickness direction of the glass blank 20. These continuous instances of focusing are collectively referred to as "focal lines". Accordingly, optical energy concentrates linearly in the thickness direction of the glass blank 20, and plasma is produced from a portion of the glass blank 20, thus making it possible to form a defect D extending in the thickness direction of the glass blank 20. Here, the defect D includes at least one of a hole formed in the glass blank 20, a crack extending from the hole, and a modified portion of the glass (referred to as a "modified glass portion" hereinafter). The hole may be a through hole that is formed by abrasion so as to extend through the glass blank 20 in the thickness direction of the glass blank 20, or a hole that does not extend through the glass blank 20. Also, the modified glass portion may spread over the entire glass blank 20 in the thickness direction. It is preferable that these defects extend so as to be substantially orthogonal to a main surface 20a of the glass blank 20 (i.e., intersect therewith at an angle of 85° to 95°) because machining allowance for a downstream process can be easily reduced. Note that other examples of the laser beam irradiation method include a method in which self-focusing of a beam based on the Kerr effect is utilized, a method in which a Gaussian-Bessel beam is utilized together with an axicon lens, a method in which a line-focus beam formed using an aberration lens is utilized, and a method using a doughnut beam and a spherical lens. In any case, there is no particular limitation on the conditions of irradiation with the laser beam L as long as the linear defect D as described above can be formed.

It is preferable to irradiate the glass blank 20 with the laser beam L in the burst pulse mode in which an optical pulse group composed of pulsed optical pulses continuously generated at a fixed time interval is taken as one unit, and a plurality of optical pulse groups are intermittently generated. In this case, optical energy of one pulse in one optical pulse group may be modulated. The defect D can be effectively formed using a laser beam in the burst pulse mode.

Figure 4A:
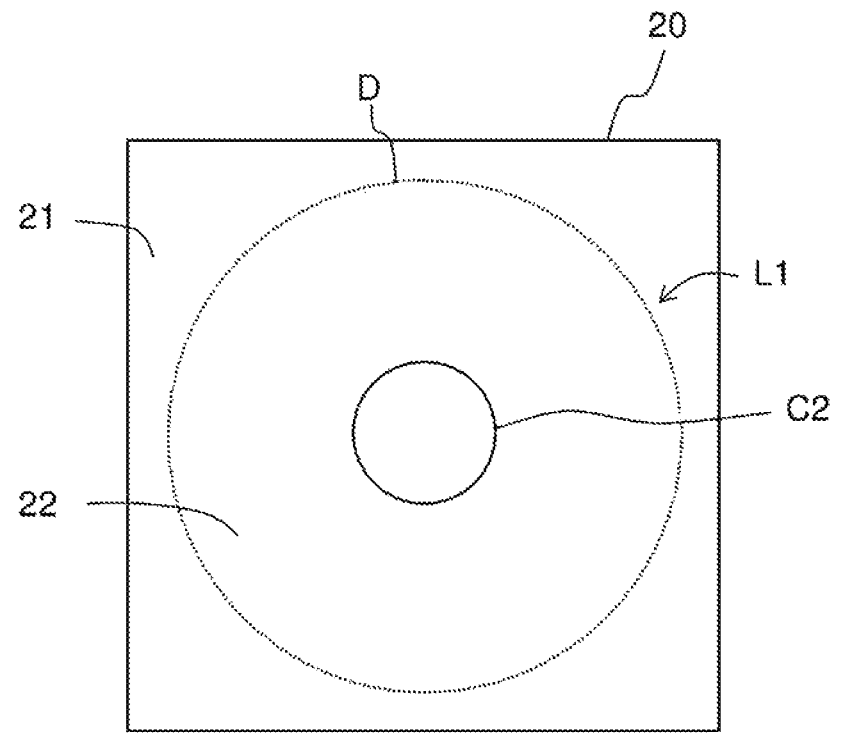
FIG. 4A is a diagram showing a glass blank on which an outer separation line is formed as viewed in a direction perpendicular to the main surfaces.

The glass blank 20 is fixed to a stage T and is then irradiated with the laser beam L while the glass blank 20 is moved relative to the laser beam L at a constant speed. For example, the stage T and the glass blank 20 may be moved in a circular pattern at a constant speed, or rotated about the central axis at a constant speed, with the laser beam L emitting position being fixed. Here, the speed of the glass blank 20 relative to the laser beam L (the speed relative to the laser beam L emitting position) can be set to, for example, 10 to 1000 (mm/second). The glass blank 20 is intermittently irradiated with the laser beam L at a constant cycle while the laser beam L moves along the predetermined circle C1 on the glass blank 20 in a counterclockwise direction indicated by the arrow in FIG. 3. In other words, a plurality of locations on the circle C1 that are separated from each other at regular intervals (also referred to as "pitch" hereinafter) are successively irradiated with the laser beam L. This pitch is determined based on the cycle of the pulse irradiation with the laser beam L and the speed of the glass blank 20 relative to the laser beam L, and can be set to, for example, 1 to 20 μm. In one example, the irradiation with the laser beam L is performed along a distance longer than one lap of the circle C1, that is, the irradiation with the laser beam L is performed until the laser beam L passes the position on the circle C1 that was first irradiated with the laser beam L. Thus, a circular outer separation line L1 as shown in FIG. 4A is formed on the glass blank 20 by a plurality of defects D that are periodically lined up along the circle C1 at regular intervals, the defects D including a defect D1 formed by the first pulse irradiation, a defect D2 formed by the second pulse irradiation, a defect D3 formed by the third pulse irradiation, a defect D4 formed by the fourth pulse irradiation, and so on. Note that, in the following description, an interval between two defects D means a distance between the centers of the two defects D. The circle C1 is an example of a predetermined circle of the present invention, and the outer separation line L1 is an example of a separation line of the present invention.

Figure 4B:
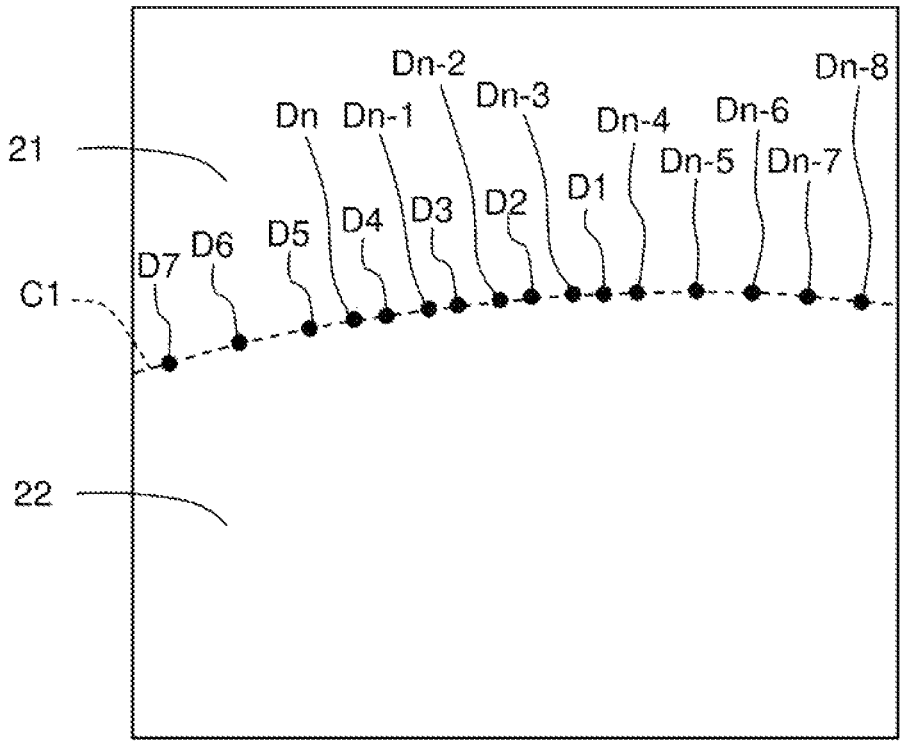
FIG. 4B is a partially enlarged view of the outer separation line.

Here, the pitch between the defects D is determined based on the cycle of the pulse irradiation with the laser beam L and the speed of the glass blank 20 relative to the laser beam L. It is preferable that the pitch between the defects D is adjusted so as not to be 1/n (n is an integer) of the circumferential length of the circle C1. In other words, it is preferable that the cycle of the pulse irradiation with the laser beam L and the speed of the glass blank 20 relative to the laser beam L are adjusted such that the circumferential length of the circle C1 is not an integral multiple of the pitch between the defects D. In doing so, in the second-lap irradiation with the laser beam L, defects D can be formed at positions different from the positions of the defects D formed in the first-lap irradiation with the laser beam L. That is to say, in the second-lap irradiation with the laser beam L, a defect D can be formed between a pair of adjacent defects D formed in the first-lap irradiation with the laser beam L. It can also be said that, it is preferable that the pitch between the defects D is adjusted such that the positions of defects D formed in the second-lap irradiation are different from the positions of the defects D formed in the first-lap irradiation (i.e., a defect D formed in the second-lap irradiation is located between a pair of adjacent defects D formed in the first-lap irradiation). For example, as shown in FIG. 4B, a defect Dn formed through the last pulse irradiation (in the second-lap irradiation) with the laser beam L is not located at the same position as the position of the defect D4 formed through the fourth pulse irradiation (in the first-lap irradiation) with the laser beam L or the position of the defect D5 formed through the fifth pulse irradiation (in the first-lap irradiation), but is located between the pair of adjacent defects D4 and D5. Similarly, a defect Dn-1 formed in the second-lap irradiation is located between the defect D3 and the defect D4, which were formed in the first-lap irradiation, a defect Dn-2 formed in the second-lap irradiation is located between the defect D2 and the defect D3, which were formed in the first-lap irradiation, and a defect Dn-3 formed in the second-lap irradiation is located between the defect D1 and the defect D2, which were formed in the first-lap irradiation. The interval between the defect Dn-4 and the defect D1 is shorter than the interval between the defect Dn-4 and the defect Dn-3. That is to say, in FIG. 4B, although the defects D1 to the defects Dn are formed in the stated order along the circle C1 in the counterclockwise direction at substantially regular intervals, the interval between a pair of adjacent defects D in the region between the defect Dn-4 and the defect D5 (in the counterclockwise direction) is shorter than that in the region between the defect D5 and the defect Dn-4 (in the counterclockwise direction). It is preferable that the interval between any pair of adjacent defects D in the region between the defect Dn-4 and the defect D5 (in the counterclockwise direction) is 70% or less of the interval between a pair of adjacent defects D in the region between the defect D5 and the defect Dn-4 (in the counterclockwise direction). The reason for this is that a region in which the defects D are lined up at short intervals is likely to trigger the formation of a crack along the outer separation line L1 in the first separation step (S20), which will be described later. Note that it is conceivable that irradiation with the laser beam L is performed along only one lap of the circle C1 under conditions where defects D are formed at a shorter pitch compared with this embodiment, but this is different from the case where the formation of a crack is facilitated by intentionally forming a region in which defects D are lined up at a different (short) pitch on the circle C1. In addition, the number of formed defects D increases, which leads to a decrease in productivity. Also, it is preferable that the length of the region between the defect Dn-4 and the defect D5 (the sum of the intervals of adjacent defects D between the defect Dn-4 and the defect D5) is 12.5% or less of the circumferential length of the circle C1. Note that, if the length of the region between the defect Dn-4 and the defect D5 exceeds 12.5% of the circumferential length of the circle C1, the productivity may deteriorate and the number of instances of chipping may increase. Although the reason for this is not entirely clear, it is inferred that, if the ratio of the region in which the interval between a pair of adjacent defects D is short to the circumference of the circle C1 is excessively large, this region tends to come off first from an outer portion 21 (see FIG. 6) and be inclined with respect to the outer portion 21 in the first separation step (S20), which will be described later, and the edge of this region catches on the outer portion 21, which causes chipping, when the outer portion 21 is removed. From the viewpoint above, 10% or less is more preferable, 5% or less is even more preferable, and 1% or less is most preferable. Note that the lower limit is, for example, 0.01%, and there is a risk that the effects of the present invention, which will be described later, are not obtained in the case of the ratio being less than 0.01%. Here, the distance between the defect Dn-4 (the last defect formed in the first-lap irradiation) and the defect D1 (the first defect formed in the first-lap irradiation) is generally much shorter than the circumferential length of the circle C1. Accordingly, when the ratio of the length of a second region (the region between the defect Dn-4 and the defect Dn), which will be described later, to the circumferential length of the circle C1 is sufficiently small (e.g., 0.01% or less), this region may be substantially ignored. That is to say, a region that is irradiated with the laser beam L along the circle C1 after the first-lap irradiation is performed may be taken as the second region of the present invention, which will be described later.

It is preferable that the interval between a pair of adjacent defects D is short in only one region on the circumference of the circle C1. It is possible to prevent failure of separation and chipping by gathering regions in which the interval between a pair of adjacent defects D is short in one place. Although the reason for this is not clear, it is inferred that a location in which warping is concentrated is formed on the circular outer separation line L1 in the first separation step (S20), which will be described later, as a result of gathering regions in which the interval between a pair of adjacent defects D is short in one place, and a crack or gap is likely to start from this location. Also, advantageously, a region in which the interval between a pair of adjacent defects D is short can be effectively formed by gathering regions in which the interval between a pair of adjacent defects D is short in one place.

Note that the region between a defect D formed through the last irradiation in the first-lap irradiation and a defect D formed through the last irradiation in the second-lap irradiation (e.g., the region between the defect Dn-4 and the defect Dn in the counterclockwise direction shown in FIG. 4B) is the second region of the present invention, and a region in which defects D are lined up at regular intervals (e.g., the region between the defect D5 and the defect Dn-4 in the counterclockwise direction shown in FIG. 4B) is a first region of the present invention. Also, the interval between the defect D4 and the defect D5 is an example of a first interval of the present invention. The first interval can be set to, for example, 1 to 20 μm. The interval between the defect D4 and the defect Dn, and the interval between the defect Dn and the defect D5 are examples of an interval that is shorter than the first interval of the present invention. The defects D1, D2, D3, . . . , Dn-6, Dn-5, and Dn-4 formed in the first-lap irradiation with the laser beam L are examples of a first defect of the present invention, and the defects Dn-3, Dn-2, Dn-1, and Dn formed in the second-lap irradiation with the laser beam L are examples of a second defect of the present invention.

Figure 5:
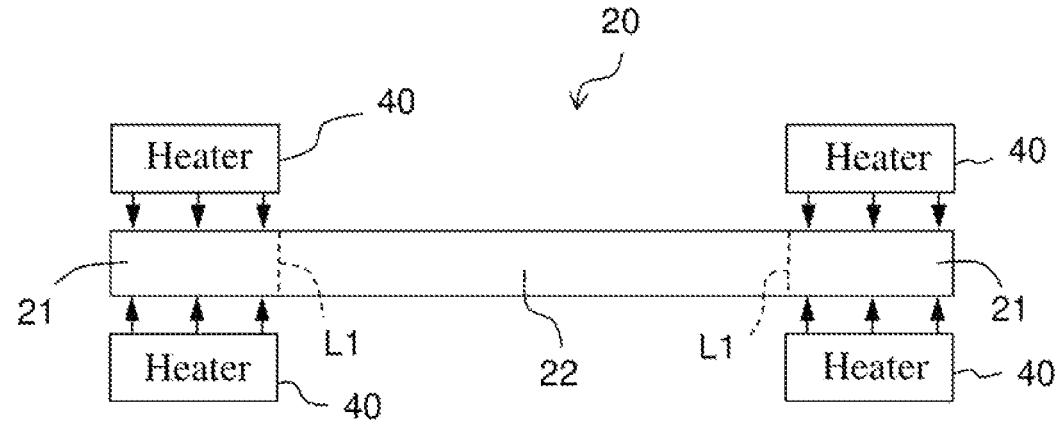
FIG. 5 is a diagram for illustrating heating in a first separation step.
Figure 6:
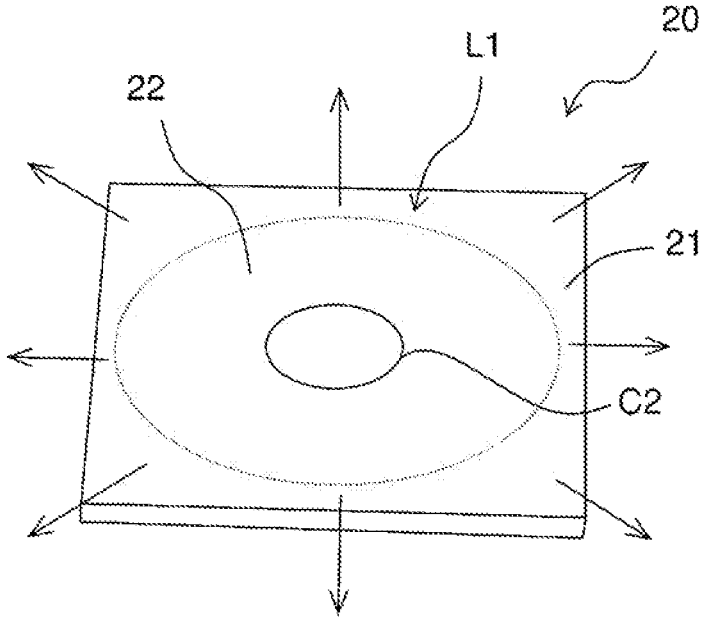
FIG. 6 is a diagram for illustrating separation through heating in the first separation step.
Figure 7:
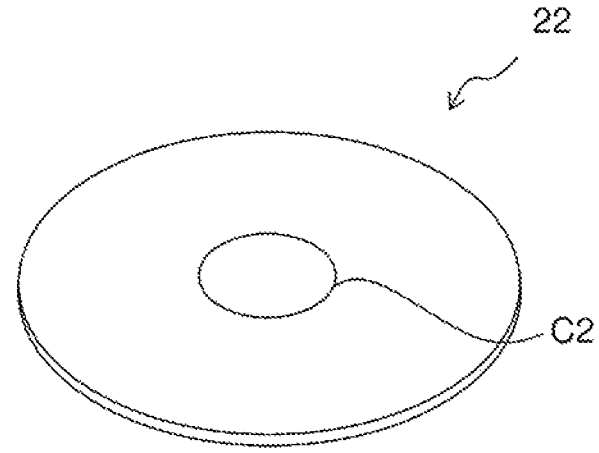
FIG. 7 is a perspective view of a circular glass blank taken out in the first separation step.

Next, in the first separation step (S20), the glass blank 20 is heated in order to take out a portion inside the outer separation line L1 from the glass blank 20 on which the outer separation line L1 has been formed. When heating the glass blank 20, heaters 40 are disposed outside the outer separation line L1, and then the outer portion 21 outside the outer separation line L1 of the glass blank 20 is heated, for example, as shown in FIG. 5. Note that it is not preferable to dispose a heater inside the outer separation line L1. In this case, although the inner portion 22 inside the outer separation line L1 is also indirectly heated due to heat conduction via a space or heat conduction via the glass blank 20, it can be said that the outer portion 21 of the glass blank 20 is heated at a higher temperature than the inner portion 22. Accordingly, the thermal expansion amount of the outer portion 21 of the glass blank 20 can be made larger than the thermal expansion amount of the inner portion 22. As a result, as shown in FIG. 6, the outer portion 21 of the glass blank 20 thermally expands outward with respect to the outer separation line L1. Specifically, the outer portion 21 thermally expands relative to the inner portion 22, so that the diameter of the inner circumference (inner diameter) of the outer portion 21 is larger than the diameter of the outer circumference (outer diameter) of the inner portion 22. As a result, first, a crack develops along the entire outer separation line L1, and thus a circular glass blank 22 is formed (however, the glass blank is still in one piece at this point of time). Next, a gap is formed at an interface between the outer portion 21 and the inner portion 22 of the glass blank 20 by further heating the outer portion 21, thus making it possible to separate the outer portion 21 and the inner portion 22. That is to say, the circular glass blank 22 can be taken out from the rectangular glass blank 20 as shown in FIG. 7. The outer circumferential edge surface of the circular glass blank 22 ultimately corresponds to the outer circumferential edge surface 12 of the annular glass substrate 1. Note that "a state in which a gap is formed at an interface between the outer portion 21 and the inner portion 22" encompasses not only a state in which a measurable space is formed throughout a portion between the outer portion 21 and the inner portion 22, but also a state in which surfaces of the outer portion 21 and the inner portion 22 that are opposed to each other are connected neither physically nor chemically even when a measurable space is not obtained. In other words, a state in which a gap is formed at the interface also encompasses a state in which cracks develop at the interface between the outer portion 21 and the inner portion 22, and the outer portion 21 and the inner portion 22 are in contact with each other.

Figure 8:
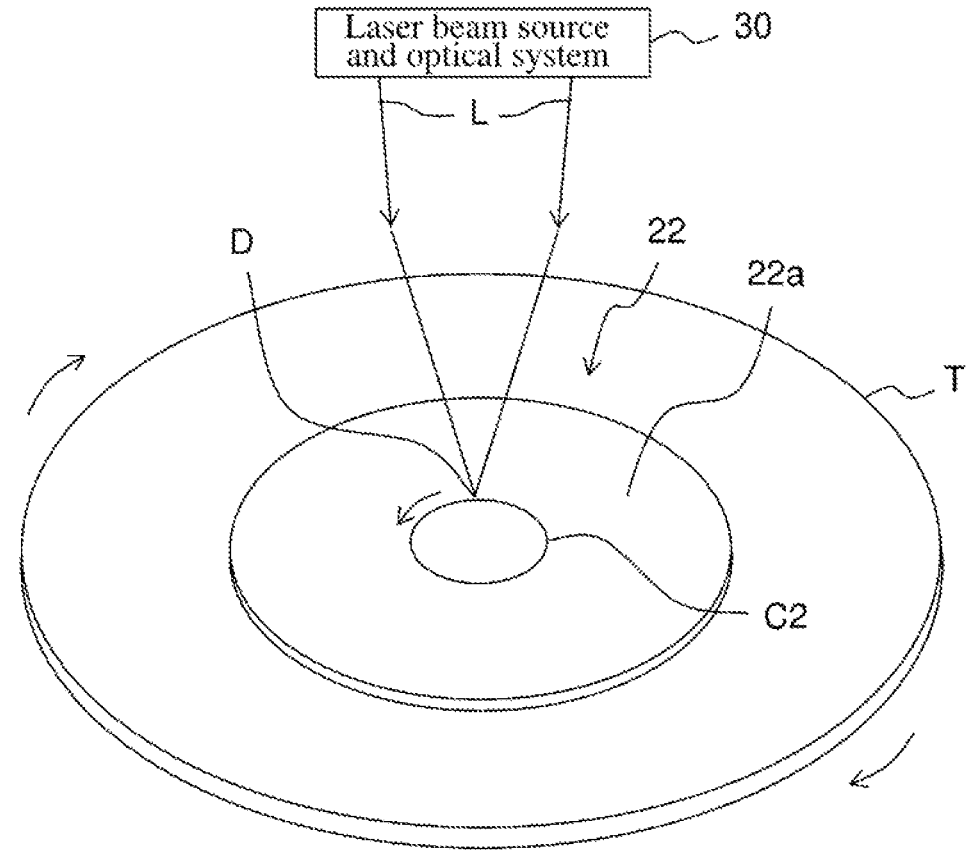
FIG. 8 is a diagram for illustrating irradiation with a laser beam in an inner separation line formation step.

Next, in the inner separation line formation step (S30), as shown in FIG. 8, an inner separation line is formed by irradiating a main surface 22*a* of the circular glass blank 22 separated in the first separation step (S20) with the laser beam L along a predetermined circle C2.

Figure 9A:
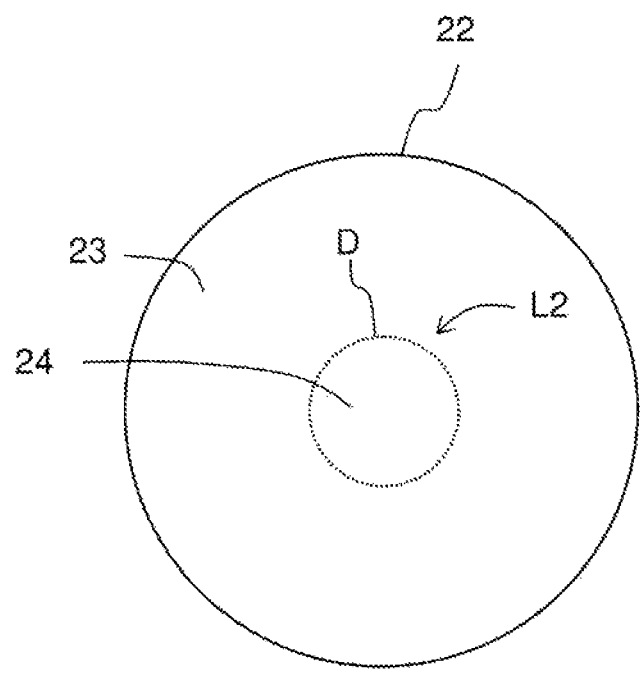
FIG. 9A is a diagram showing a circular glass blank on which an inner separation line is formed as viewed in a direction perpendicular to the main surfaces.

As in the outer separation line formation step (S10), the circular glass blank 22 is fixed to the stage T and is then irradiated with the laser beam L while the circular glass blank 22 is moved relative to the laser beam L at a constant speed. For example, the stage T and the circular glass blank 22 may be moved in a circular pattern at a constant speed, or rotated about the central axis at a constant speed, with the laser beam L emitting position being fixed. The circular glass blank 22 is intermittently irradiated with the laser beam L at a constant cycle while the laser beam L moves along the predetermined circle C2 on the main surface 22*a* of the circular glass blank 22 in a counterclockwise direction indicated by the arrow in FIG. 8. In other words, a plurality of locations on the circle C2 that are separated from each other at regular intervals are successively irradiated with the laser beam L. The irradiation with the laser beam L is performed along a distance longer than one lap of the circle C2, that is, the irradiation with the laser beam L is performed until the laser beam L passes the position on the circle C2 that was first irradiated with the laser beam L. Thus, a circular inner separation line L2 as shown in FIG. 9A is formed on the circular glass blank 22 by a plurality of defects D that are periodically lined up along the circle C2 at regular intervals, the defects D including a defect D1 formed by the first pulse irradiation, a defect D2 formed by the second pulse irradiation, a defect D3 formed by the third pulse irradiation, a defect D4 formed by the fourth pulse irradiation, and so on. Note that the circle C2 is an example of a second circle of the present invention, and the inner separation line L2 is an example of a second separation line of the present invention.

Figure 9B:
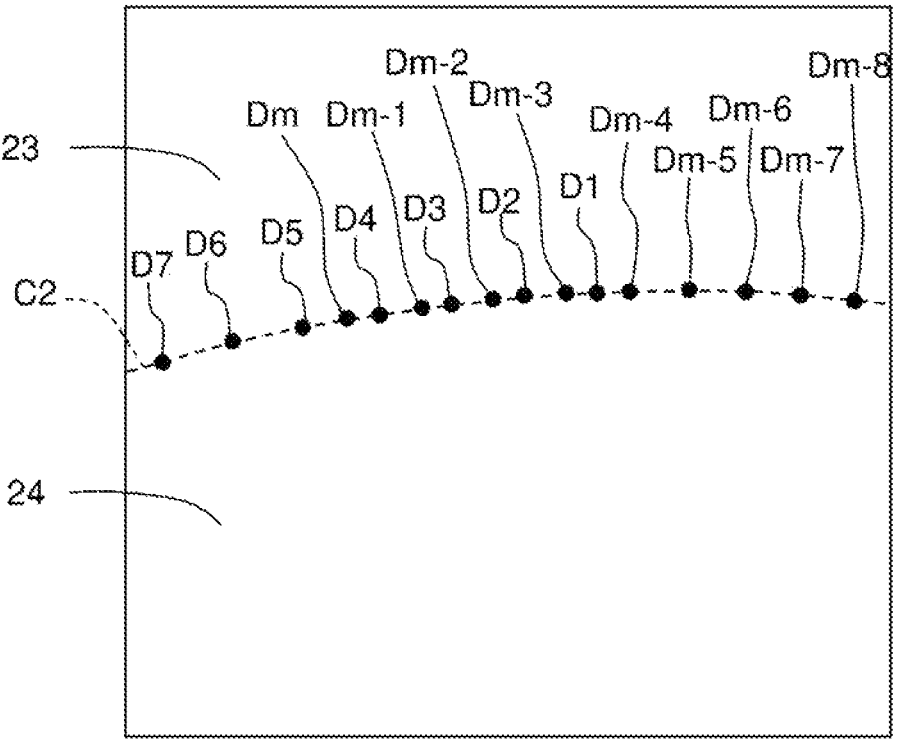
FIG. 9B is a partially enlarged view of the inner separation line.

It is preferable that the laser pulse irradiation cycle is adjusted so as not to be 1/m (m is an integer) of the circumferential length of the circle C2. In other words, it is preferable that the cycle of the pulse irradiation with the laser beam L and the speed of the circular glass blank 22 relative to the laser beam L are adjusted such that the circumferential length of the circle C2 is not an integral multiple of the pitch between the defects D. In doing so, in the second-lap irradiation with the laser beam L, defects D can be formed at positions different from the positions of the defects D formed in the first-lap irradiation with the laser beam L. That is to say, in the second-lap irradiation with the laser beam L, a defect D can be formed between a pair of adjacent defects D formed in the first-lap irradiation with the laser beam L. It can also be said that it is preferable that the pitch between the defects D is adjusted such that the positions of defects D formed in the second-lap irradiation are different from the positions of the defects D formed in the first-lap irradiation (i.e., a defect D formed in the second-lap irradiation is located between a pair of adjacent defects D formed in the first-lap irradiation). For example, as shown in FIG. 9B, a defect Dm formed through the last pulse irradiation (in the second-lap irradiation) with the laser beam L is not located at the same position as the position of the defect D4 formed through the fourth pulse irradiation (in the first-lap irradiation) with the laser beam L or the position of the defect D5 formed through the fifth pulse irradiation (in the first-lap irradiation), but is located between the pair of adjacent defects D4 and D5. Similarly, a defect Dm-1 formed in the second-lap irradiation is located between the defect D3 and the defect D4, which were formed in the first-lap irradiation, a defect Dm-2 formed in the second-lap irradiation is located between the defect D2 and the defect D3, which were formed in the first-lap irradiation, and a defect Dm-3 formed in the second-lap irradiation is located between the defect D1 and the defect D2, which were formed in the first-lap irradiation. The interval between the defect Dm-4 and the defect D1 is shorter than the interval between the defect Dm-4 and the defect Dm-3, and the interval between the defect Dm-5 and the defect Dm-4. That is to say, in FIG. 9B, although the defects D1 to the defects Dm are formed in the stated order along the circle C2 in the counterclockwise direction at substantially regular intervals, the interval between a pair of adjacent defects D in the region between the defect Dm-4 and the defect D5 (in the counterclockwise direction) is shorter than that in the region between the defect D5 and the defect Dm-4 (in the counterclockwise direction). It is preferable that the interval between any pair of adjacent defects D in the region between the defect Dm-4 and the defect D5 (in the counterclockwise direction) is 70% or less of the interval between a pair of adjacent defects D in the region between the defect D5 and the defect Dm-4 (in the counterclockwise direction). The reason for this is that a region in which the defects D are lined up at short intervals is likely to trigger the formation of a crack along the inner separation line L2 in the second separation step (S40), which will be described later. Also, it is preferable that the length of the region between the defect Dm-4 and the defect D5 (in the counterclockwise direction) (the sum of the intervals of adjacent defects D between the defect Dm-4 and the defect D5) is 12.5% or less of the circumferential length of the circle C2. Note that, if this length exceeds 12.5%, the productivity may deteriorate and the number of instances of chipping may increase. Although the reason for this is not entirely clear, it is inferred that, if the ratio of the region in which the interval between a pair of adjacent defects D is short to the circumference of the circle C2 is excessively large, this region tends to come off first from an outer portion 23 (see FIG. 11) and be inclined with respect to the outer portion 23 in the second separation step (S40), which will be described later, and the edge of this region catches on the outer portion 23, which causes chipping, when the outer portion 21 is removed. From the viewpoint above, 10% or less is more preferable, 5% or less is even more preferable, and 1% or less is most preferable. Note that the lower limit is 0.01%, and there are cases where the effects of the present invention, which will be described later, are not obtained in the case of the ratio being less than 0.01%. The interval (second interval) demarcated by the defects D1 and D2 formed in the inner separation line formation step (S30) may be the same as the interval (see FIG. 4B; first interval) demarcated by the defects D1 and D2 formed in the outer separation line formation step (S10), but is preferably shorter than the first interval. It is more preferable that the second interval is 10 to 80% of the first interval. If the second interval is more than 80% of the first interval, the smaller the radius of a circle to be separated is, the more difficult it is to maintain a difference in the temperature between the inside and the outside of the circle, and therefore, the cost may increase due to, for example, the need for a powerful heater. If the second interval is less than 10% of the first interval, a pulse laser with a significantly high frequency is needed, and thus the cost may increase.

Note that the region between a defect D formed through the last irradiation in the first-lap irradiation and a defect D formed through the last irradiation in the second-lap irradiation (e.g., the region between the defect Dm-4 and the defect Dm in the counterclockwise direction shown in FIG. 9B) is the third region of the present invention, and a region in which defects D are lined up at regular intervals (e.g., the region between the defect D5 and the defect Dm-4 in the counterclockwise direction shown in FIG. 9B) is the fourth region of the present invention. Also, the interval between the defect D4 and the defect D5 is an example of a second interval of the present invention. The interval between the defect D4 and the defect Dm, and the interval between the defect Dm and the defect D5 are examples of an interval that is shorter than the second interval of the present invention. The defects D1, D2, D3, . . . , Dm-6, Dm-5, and Dm-4 formed in the first-lap irradiation with the laser beam L are examples of a first defect of the present invention, and the defects Dm-3, Dm-2, Dm-1, and Dm formed in the second-lap irradiation with the laser beam L are examples of a second defect of the present invention. Note that the defects D1 to D6 shown in FIG. 9B are examples of a third defect of the present invention, the defect Dm is an example of a fourth defect of the present invention, and the interval between the defect D1 and the defect D2 is an example of a second predetermined interval of the present invention.

Figure 10:
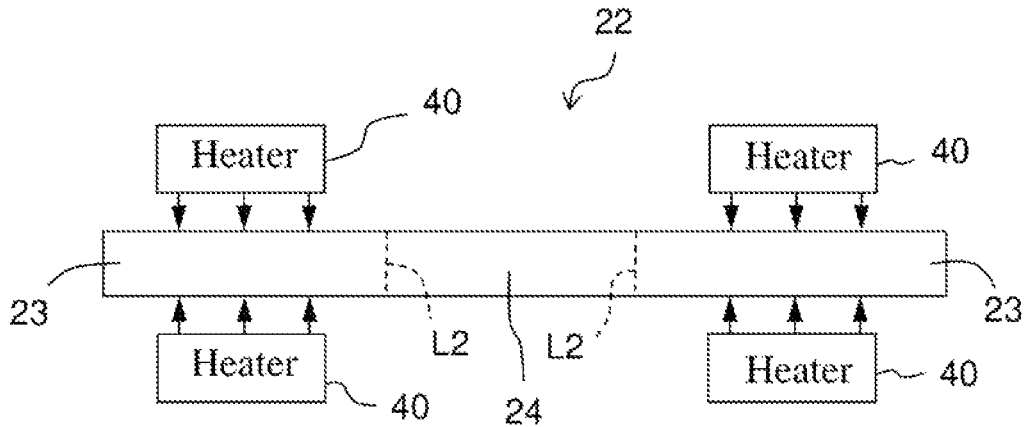
FIG. 10 is a diagram for illustrating heating in a second separation step.
Figure 11:
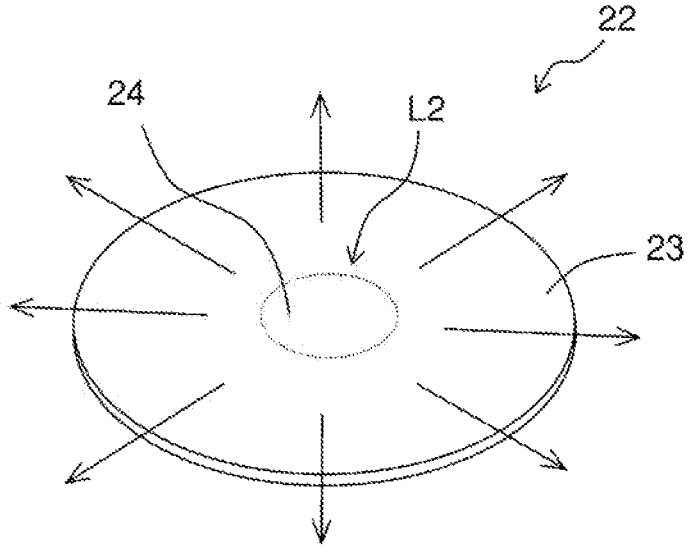
FIG. 11 is a diagram for illustrating separation through heating in the second separation step.

Next, in the second separation step (S40), the circular glass blank 22 is heated in order to take out a portion inside the inner separation line L2 from the circular glass blank 22 on which the inner separation line L2 has been formed. When heating the circular glass blank 22, heaters 40 are disposed outside the inner separation line L2, and then the outer portion 23 outside the inner separation line L2 of the circular glass blank 22 is heated, for example, as shown in FIG. 10. Note that it is not preferable to dispose a heater inside the inner separation line L2. In this case, although the inner portion 24 inside the inner separation line L2 is also indirectly heated due to heat conduction via a space or heat conduction via the circular glass blank 22, it can be said that the outer portion 23 of the circular glass blank 22 is heated at a higher temperature than the inner portion 24. Accordingly, the thermal expansion amount of the outer portion 23 of the circular glass blank 22 can be made larger than the thermal expansion amount of the inner portion 24. As a result, as shown in FIG. 11, the outer portion 23 of the circular glass blank 22 thermally expands outward with respect to the inner separation line L2. Specifically, the outer portion 23 thermally expands relative to the inner portion 24, so that the diameter of the inner circumference (inner diameter) of the outer portion 23 is larger than the diameter of the outer circumference (outer diameter) of the inner portion 24. Thus, a gap is formed at an interface between the outer portion 23 and the inner portion 24 of the circular glass blank 22, thus making it possible to separate the outer portion 23 and the inner portion 24. That is to say, the annular glass substrate 1 as shown in FIG. 1, from which the central portion is removed, can be manufactured by taking out the inner portion 24 from the circular glass blank 22. The inner circumferential edge surface of the outer portion 23 of the circular glass blank 22 corresponds to the inner circumferential edge surface 13 of the annular glass substrate 1. Note that, in the second separation step (S40) as well, "a state in which a gap is formed at an interface between the outer portion 23 and the inner portion 24" encompasses not only a state in which a measurable space is formed throughout a portion between the outer portion 23 and the inner portion 24, but also a state in which surfaces of the outer portion 23 and the inner portion 24 that are opposed to each other are connected neither physically nor chemically even when a measurable space is not obtained. In other words, a state in which a gap is formed at the interface also encompasses a state in which cracks develop at the interface between the outer portion 23 and the inner portion 24, and the outer portion 23 and the inner portion 24 are in contact with each other.

Note that, when a glass substrate for a magnetic disc is manufactured, postprocessing that includes a chamfered surface formation step, an edge surface polishing step, a main surface grinding step, a main surface polishing step, and the like is further performed after the second separation step (S40), although not illustrated in the figures. Before and after each step, a washing step may be additionally performed as appropriate. Note that these steps excluding the main surface polishing step may be omitted as appropriate.

In the chamfered surface formation step, a chamfered surface is formed on the inner circumferential edge surface 13 and/or the outer circumferential edge surface 12 of the annular glass substrate 1 using, for example, a formed grindstone.

In the edge surface polishing step, the inner circumferential edge surface 13 and/or the outer circumferential edge surface 12 of the annular glass substrate 1 is polished to a mirror finish using a brush. At this time, a polishing liquid containing minute particles made of cerium oxide, zirconium oxide, or the like acting as loose abrasive particles is used. Polishing the edge surface makes it possible to prevent thermal asperities from occurring.

In the main surface grinding step, the main surfaces 11a and 11b of the annular glass substrate 1 are ground using a double-side grinding device provided with a planetary gear mechanism. The grinding allowance is, for example, approximately several μm to several hundred μm. The double-side grinding device includes an upper surface plate and a lower surface plate, and the annular glass substrate 1 is held between the upper surface plate and the lower surface plate. Then, the main surfaces 11a and 11b of the annular glass plate 1 are ground by moving the annular glass plate 1 and the surface plates relative to each other. For example, a grinding pad that includes fixed abrasive particles formed by fixing abrasive particles made of diamond or the like in a resin may be attached to the surface of the surface plate.

In the main surface polishing step, the main surfaces 11a and 11b ground in the main surface grinding step are polished. The polishing allowance is, for example, approximately 0.1 μm to 100 μm. The main surfaces are polished for the purpose of removing flaws and warping that are caused by grinding using the fixed abrasive particles and remain on the main surfaces 11*a* and 11*b*, adjustment of undulations and minute undulations, mirror finishing, roughness reduction, and the like. For example, a polishing liquid containing loose abrasive particles made of cerium oxide, zirconia, silica, or the like can be used to polish the main surfaces. Note that the main surface polishing step may be divided into two or more stages. For example, the main surface polishing step can be divided into first main surface polishing that is rough polishing using a polishing liquid containing cerium oxide or zirconia, and second main surface polishing in which a polishing liquid containing silica is used.

Next, the states of the outer circumferential edge surface 12 and the inner circumferential edge surface 13 of the annular glass substrate 1 manufactured in accordance with the manufacturing steps described above will be described with reference to FIGS. 12A and 12B. Note that FIG. 12A corresponds to the portion of the outer circumferential edge surface 12 shown in FIG. 4B, and FIG. 12B corresponds to the portion of the inner circumferential edge surface 13 shown in FIG. 9B.

Figures 12A, 12B:
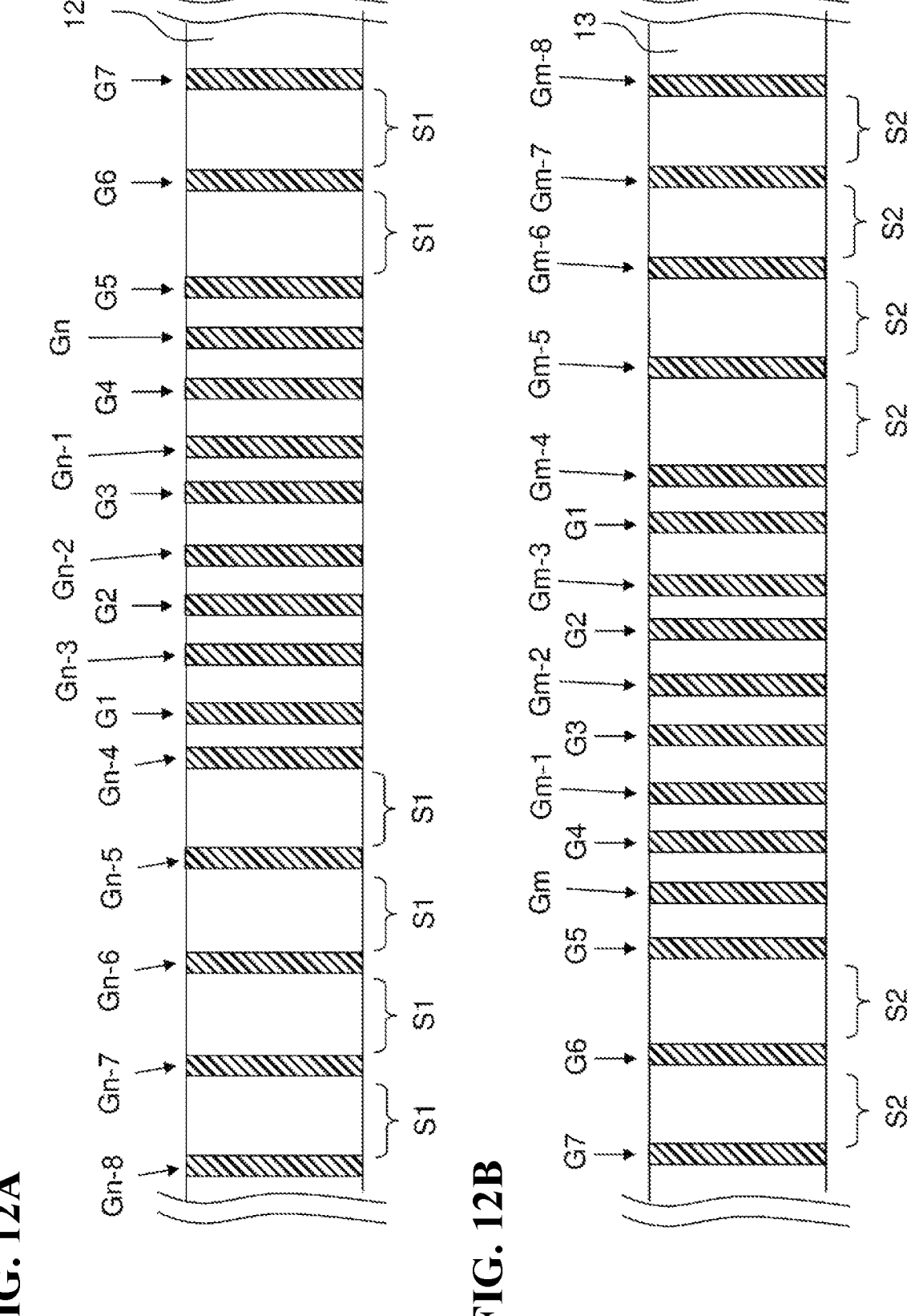
FIG. 12A is a partially enlarged view showing an outer circumferential edge surface of an annular glass substrate spread out on a plane.
FIG. 12B is a partially enlarged view showing an inner circumferential edge surface of the annular glass substrate spread out on a plane.

As shown in FIG. 12A, a plurality of grooves G extending in the thickness direction of the annular glass substrate 1 are formed on the outer circumferential edge surface 12 of the glass substrate 1. Each of the grooves is formed due to a portion of the defect D formed in the outer separation line formation step (S10) or a trace thereof remaining on the outer circumferential edge surface 12 in the first separation step (S20). Note that, in the present invention, the grooves encompass not only grooves that continuously extend in the thickness direction of the glass substrate 1 but also partial grooves extending in the thickness direction of the glass substrate 1. The width of each groove in the circumferential direction is, for example, 2 to 10 μm. In FIG. 12A, a groove G1 to a groove Gn correspond to the defect D1 to the defect Dn shown in FIG. 4B, respectively. The outer circumferential edge surface 12 includes a first region in which the grooves G from the groove G5 to the groove Gn-4 are formed in ascending order at first intervals S1, and a second region in which the grooves G from the groove Gn-4 to the groove G5 are formed with the interval between a pair of adjacent grooves G being shorter than the first intervals S1. The length in the circumferential direction of the second region of the outer circumferential edge surface 12 is, for example, 12.5% or less of the length in the circumferential direction of the outer circumferential edge surface 12. In FIG. 12A, the interval between any pair of adjacent grooves D in the second region is 70% or less of the interval between a pair of adjacent grooves G in the first region.

As shown in FIG. 12B, a plurality of grooves G extending in the thickness direction of the annular glass substrate 1 are also formed on the inner circumferential edge surface 13 of the glass substrate 1 similarly to the outer circumferential edge surface 12. Each of the grooves is formed due to a portion of the defect D formed in the inner separation line formation step (S30) or a trace thereof remaining on the inner circumferential edge surface 13 in the second separation step (S40). The width of each groove in the circumferential direction is, for example, 2 to 10 μm. In FIG. 12B, a groove G1 to a groove Gm correspond to the defect D1 to the defect Dm shown in FIG. 9B, respectively. The inner circumferential edge surface 13 includes a third region in which the grooves G from the groove G5 to the groove Gm-4 are formed in ascending order at second intervals S2, and a fourth region in which the grooves G from the groove Gm-4 to the groove G5 are formed with the interval between a pair of adjacent grooves G being shorter than the second intervals S2. Note that the second interval S2 is shorter than the first interval S1 on the outer circumferential edge surface 12, and is, for example, 10 to 80% of the first interval S1.

With the above-described manufacturing method according to an aspect of the present invention, in the outer separation line formation step (S10), the irradiation with the laser beam L is performed intermittently at a constant cycle along a distance longer than one lap of the circle C1, that is, the irradiation with the laser beam L is performed intermittently at a constant cycle until the laser beam L passes the position on the circle C1 that was first irradiated with the laser beam L. As a result, a plurality of defects D1 to Dn are formed in this order at substantially regular intervals along the circle C1 in the counterclockwise direction. At this time, a region in which the defects D are periodically lined up at substantially regular intervals (i.e., the intervals between adjacent defects D are substantially the same) (e.g., the region between the defect D5 and the defect Dn-4 in the counterclockwise direction in FIG. 4B), and a region in which the defects D are lined up such that the intervals between adjacent defects D are shorter than the above-mentioned regular intervals (e.g., the region between the defect Dn-4 and the defect D5 in the counterclockwise direction in FIG. 4B) are formed on the circle C1. Accordingly, even if the glass blank 20 is locally warped due to a difference in the thermal history in the manufacturing steps and the like, when the outer portion 21 is heated at a higher temperature than the inner portion 22 in the first separation step (S20), a pair of defects D that are adjacent to each other at a short interval (e.g., the defect D4 and the defect Dn in FIG. 4B) are more likely to be connected via a crack than another pair of defects D that are lined up at the regular interval (e.g., the defect D5 and the defect D6 in FIG. 4B). In other words, a crack or gap is more likely to form between a pair of defects D that are adjacent to each other at a short interval than between another pair of defects D that are lined up at regular intervals. Glass is a brittle material, and therefore, once cracks are formed, they are likely to propagate in glass. Accordingly, a crack or gap formed between a pair of defects D that are adjacent to each other at a short interval always stably triggers the formation of a crack or gap extending along the circumference of the circle C1, thus making it possible to reliably form a crack or gap along the entire circumference of the circle C1 between the outer portion 21 and the inner portion 22. Therefore, it is possible to reliably separate the outer portion 21 of the glass blank 20 from the inner portion 22.

Furthermore, similarly to the outer separation line formation step (S10), in the inner separation line formation step (S30) as well, the irradiation with the laser beam L is performed intermittently at a constant cycle along a distance longer than one lap of the circle C2, that is, the irradiation with the laser beam L is performed intermittently at a constant cycle until the laser beam L passes the position on the circle C2 that was first irradiated with the laser beam L. As a result, a plurality of defects D1 to Dm are formed in this order at substantially regular intervals along the circle C2 in the counterclockwise direction. At this time, a region in which the defects D are periodically lined up at substantially regular intervals (i.e., the intervals between adjacent defects D are substantially the same) (e.g., the region between the defect D5 and the defect Dm-4 in the counterclockwise direction in FIG. 9B), and a region in which the defects D are lined up such that the intervals between adjacent defects D are shorter than the above-mentioned regular intervals (e.g., the region between the defect Dm-4 and the defect D5 in the counterclockwise direction in FIG. 9B) are formed on the circle C2. Accordingly, even if the circular glass blank 22 is locally warped due to a difference in the thermal history in the manufacturing steps and the like, when the outer portion 23 of the circular glass blank 22 is heated at a higher temperature than the inner portion 24 in the second separation step (S40), a pair of defects D that are adjacent to each other at a short interval (e.g., the defect D4 and the defect Dm in FIG. 9B) are more likely to be connected via a crack than another pair of defects D that are lined up at the regular interval (e.g., the defect D5 and the defect D6 in FIG. 9B). In other words, a crack or gap is more likely to form between a pair of defects D that are adjacent to each other at a short interval than between another pair of defects D that are lined up at regular intervals. Accordingly, a crack or gap formed between a pair of defects D that are adjacent to each other at a short interval always stably triggers the formation of a crack or gap extending along the circumference of the circle C2, thus making it possible to reliably form a crack or gap along the entire circumference of the circle C2 between the outer portion 23 and the inner portion 24 of the circular glass blank 22. Therefore, it is possible to reliably separate the outer portion 23 of the circular glass blank 22 from the inner portion 24.

That is to say, with the manufacturing method according to an aspect of the present invention, it is possible to reliably separate the annular glass substrate 1 from the glass blank 20 through the steps described above.

Also, with the manufacturing method according to an aspect of the present invention, in the outer separation line formation step (S10), the irradiation with the laser beam L is performed along a distance longer than one lap of the circle C1 without changing the cycle of the pulse irradiation with the laser beam L and the speed of the glass blank 20 relative to the laser beam L. That is to say, the setting of the cycle of the pulse irradiation with the laser beam L and the setting of the relative speed need not be changed. Accordingly, a region in which the defects D are periodically lined up at substantially regular intervals (i.e., the intervals between adjacent defects D are substantially the same) and a region in which the defects D are lined up such that the intervals between adjacent defects D are shorter than the above-mentioned regular intervals can be formed through a simple method.

Furthermore, in the inner separation line formation step (S30) as well, the irradiation with the laser beam L is performed along a distance longer than one lap of the circle C2 without changing the cycle of the pulse irradiation with the laser beam L and the speed of the circular glass blank 22 relative to the laser beam L. That is to say, the setting of the cycle of the pulse irradiation with the laser beam L and the setting of the relative speed need not be changed. Accordingly, a region in which the defects D are periodically lined up at substantially regular intervals (i.e., the intervals between adjacent defects D are substantially the same) and a region in which the defects D are lined up such that the intervals between adjacent defects D are shorter than the above-mentioned regular intervals can be formed using a simple method.

Also, with the manufacturing method according to an aspect of the present invention, it is possible to take out (i.e., remove) a desired disc-shaped glass substrate from a glass blank without using a release line. A release line is a dividing line different from the separation line that is provided so as to enable dividing of the region outside the separation line in order to facilitate removal of a glass portion having a desired closed shape from a glass plate serving as a base material, and the formed release line includes a plurality of defects, for example, similarly to the separation line described above. In the case of employing the release line, there is no need to form a gap between the portion outside the separation line and the portion inside the separation line by heating the portion outside the separation line, but there are some disadvantages. Since the release line is not used in the manufacturing method according to an aspect of the present invention, it is possible to prevent (generation of) unnecessary glass waste, and thus it is easy to handle the remainder (unnecessary portion) after the separation. Also, it is very difficult to take out a desired disc-shaped glass substrate from a glass blank. The reasons for this are that the temperature of glass is generally less likely to be increased, the linear expansion coefficient of glass is small, the portion outside the separation line and the portion inside the separation line are likely to catch on each other in the same way that a circular manhole cover does not fall through a manhole, etc. With the manufacturing method according to an aspect of the present invention, it is possible to more reliably remove a desired disc-shaped glass substrate from a glass blank using a simple method.

Examples

The outer separation line formation step (S10) of this embodiment was performed under various conditions shown in Table 1 below. Then, glass plates on which an outer separation line L1 was formed were subjected to the first separation step (S20) of this embodiment under the same conditions, and the defect rate was verified. Note that a square glass plate material having a length of 110 mm, a width of 110 mm, and a thickness of 0.7 mm obtained by dividing a glass plate manufactured using an overflow downdraw method was used as the glass blank 20. An outer separation line L1 having a diameter of 98 mm was formed on the glass blank 20. The irradiation with the laser beam L was performed without changing the cycle of the pulse irradiation with the laser beam L and the speed of the glass blank 20 relative to the laser beam L so as to continuously form defects D at predetermined intervals. The total occurrence rate of a separation failure and chipping was taken as the defect rate (%). The defect rate (%) was calculated by performing the first separation step (S20) on 1000 or more glass plates that had been subjected to the outer separation line formation step (S10) under each of the conditions. In Table 1 below, "Predetermined interval" means the interval between a pair of adjacent defects D formed through continuous two pulses of irradiation. Moreover, "Interval between first defect and second-lap first defect" means the interval between a defect D formed through the first irradiation of the first-lap irradiation and a defect D formed through the first irradiation of the second-lap irradiation, such as the interval between the defect D1 and the defect Dn-3 shown in FIG. 4B. In addition, regarding "Defect rate (rank)", ratios of the defect rates to the defect rate of Comparative Example 1 (represented as "C") were calculated, and a defect rate that was 95% or more and less than 100% of that of Comparative Example 1 was represented as "B", and a defect rate that was less than 95% of that of Comparative Example 1 was represented as "A". That is to say, a defect rate represented as "A" was low and the best, and a defect rate represented as "B" was the second best.

TABLE 1

| Pre-determined interval (μm) | Interval between first defect and second-lap first defect (μm) | Angle of irradiation beyond 360° (°) | Ratio of second region to circum-ferential length (%) | Defect rate (rank) |
|---|---|---|---|---|
| Comp. Ex. 1 | 10 | 0 | — | 0 | C |
| Ex. 1 | 10 | 8.0 | 3.6 | 1.0 | B |
| Ex. 2 | 10 | 7.0 | 3.6 | 1.0 | A |
| Ex. 3 | 10 | 6.0 | 3.6 | 1.0 | A |
| Ex. 4 | 10 | 5.0 | 3.6 | 1.0 | A |
| Ex. 5 | 10 | 5.0 | 0.36 | 0.1 | A |
| Ex. 6 | 10 | 5.0 | 1.8 | 0.5 | A |
| Ex. 7 | 10 | 5.0 | 18 | 5.0 | A |
| Ex. 8 | 10 | 5.0 | 45 | 12.5 | A |
| Ex. 9 | 10 | 5.0 | 90 | 25.0 | B |

It was found from the results shown in Table 1 above that, compared with the case where the interval between the first defect and the second-lap first defect exceeded 70% of the predetermined interval (Example 1), a low and favorable defect rate was achieved in the cases where the interval between the first defect and the second-lap first defect was 70% or less of the predetermined interval (Examples 2 to 4). It was also found that, compared with the case where the ratio of the second region to the circumferential length exceeded 12.5% (Example 9), a low and favorable defect rate was achieved in the cases where the ratio of the second region to the circumferential length was 12.5% or less (Examples 5 to 8). Note that, when the outer circumferential edge surfaces of circular glass blanks (having a diameter of 98 mm and a thickness of 0.7 mm) separated in the first separation step (S20) were observed using a laser microscope, a plurality of grooves extending in the thickness direction were present, and the first region and the second region were formed in each example. The width of each groove was 3 μm.

Subsequently, non-defective products of circular glass blanks manufactured under the conditions for Example 4 shown in Table 1 above were subjected to the inner separation line formation step (S30) of this embodiment under various conditions shown in Table 2 below. Then, circular glass plates on which an inner separation line L2 was formed were subjected to the second separation step (S40) of this embodiment under the same conditions, and the defect rate was verified. In the inner separation line formation step (S30), an inner separation line L2 having a diameter of 24 mm was formed on the circular glass blank having a diameter of 98 mm. The irradiation with the laser beam L was performed without changing the cycle of the pulse irradiation with the laser beam L and the speed of the circular glass blank relative to the laser beam L so as to continuously form defects D at predetermined intervals. The total occurrence rate of a separation failure and chipping was taken as the defect rate (%). The defect rate (%) was calculated by performing the second separation step (S40) on 1000 or more glass plates that had been subjected to the inner separation line formation step (S30) under each of the conditions. In Table 2 below, "Predetermined interval" and "Interval between first defect and second-lap first defect" are the same in meaning as those in Table 1 above. In addition, regarding "Defect rate (rank)", ratios of the defect rates to the defect rate of Comparative Example 2 (represented as "C") were calculated, and a defect rate that was less than 95% of that of Comparative Example 2 was represented as "A".

TABLE 2

| Pre-determined interval (μm) | Interval between first defect and second-lap first defect (μm) | Angle of irradiation beyond 360° (°) | Ratio of second region to circum-ferential length (%) | Defect rate (rank) |
|---|---|---|---|---|
| Comp. Ex. 2 | 10 | 0 | — | 0 | C |
| Ex. 10 | 10 | 5.0 | 3.6 | 1.0 | A |
| Ex. 11 | 8 | 4.0 | 3.6 | 1.0 | A |

As shown in Table 2 above, the defect rates of Example 10 and Example 11 were both ranked "A". However, when Examples 10 and 11 were compared in detail, Example 11 in which the predetermined interval was smaller than the predetermined interval (10 μm) in the outer separation line formation step (S10) was slightly better. Note that, when the inner circumferential edge surfaces of annular glass substrates (having an outer diameter of 98 mm, an inner diameter of 24 mm, and a thickness of 0.7 mm) separated in the second separation step (S40) were observed using a laser microscope, a plurality of grooves extending in the thickness direction were present, and the third region and the fourth region were formed in each example. The width of each groove was 3 μm.

Furthermore, non-defective products of annular glass substrates manufactured under the conditions for Examples 10 and 11 shown in Table 2 above were successively subjected to the chamfered surface formation step, the edge surface polishing step, the main surface grinding step, the main surface polishing step, and the washing step of this embodiment to obtain glass substrates for a magnetic disc having an outer diameter of 97 mm, an inner diameter of 25 mm, and a thickness of 0.5 mm.

Although the embodiments of the present invention have been described thus far, the present invention is not limited to the embodiments above, and various modifications can be made within the scope recited in the claims. Hereinafter, modified examples of the embodiments above will be described.

In the outer separation line formation step (S10) and the inner separation line formation step (S30) of the embodiments above, irradiation with the laser beam L is performed intermittently at a constant cycle along a distance longer than one lap of the circles C1 and C2, but there is no limitation to this configuration. For example, the irradiation with the laser beam L may be performed along only one lap of the circles C1 and C2 at a constant cycle while the speed of movement or rotation of the stage T is changed. In this case, when the speed of the stage T is low, the interval between a pair of adjacent defects D is reduced, whereas when the speed of the stage T is high, the interval between a pair of adjacent defects D is increased. Accordingly, in the outer separation line formation step (S10), the first region in which defects are periodically formed and the interval between a pair of adjacent defects is the first interval may be formed by increasing the speed of the stage T, and the second region in which defects are periodically formed and the interval between a pair of adjacent defects is shorter than the first interval may be formed by reducing the speed of the stage T. Similarly, in the inner separation line formation step (S30), the third region in which defects are periodically formed and the interval between a pair of adjacent defects is the second interval may be formed by increasing the speed of the stage T, and the fourth region in which defects are periodically formed and the interval between a pair of adjacent defects is shorter than the second interval may be formed by reducing the speed of the stage T. In this case, the interval shorter than the first interval is preferably 70% or less of the first interval. With this configuration, the defects D are continuously lined up at sufficiently shorter intervals than the first intervals, and therefore, cracks are triggered in the subsequent separation step (S20), thus making it easier to reduce the occurrence of a separation failure or chipping. Also, the interval shorter than the second interval is preferably 70% or less of the second interval for the same reason as described above. Moreover, for the same reason as in the embodiments above, it is preferable that the second region is constituted by a single portion on the circumference of the circle C1, and the fourth region is constituted by a single portion on the circumference of the circle C2. Also, it is preferable that the length of the second region is 12.5% or less of the length of the circumference of the circle C1, and the length of the fourth region is 12.5% or less of the length of the circumference of the circle C2.

Alternatively, the irradiation with the laser beam L may be performed along only one lap of the circles C1 and C2 with the irradiation cycle being changed while the speed of movement or rotation of the stage T is kept constant. In this case, when the cycle of the irradiation with the laser beam L is short, the interval between a pair of adjacent defects D is reduced, whereas when the cycle of the irradiation with the laser beam L is long, the interval between a pair of adjacent defects D is increased. Accordingly, in the outer separation line formation step (S10), the first region in which defects are periodically formed and the interval between a pair of adjacent defects is the first interval may be formed by increasing the cycle of the irradiation with the laser beam L, and the second region in which defects are periodically formed and the interval between a pair of adjacent defects is shorter than the first interval may be formed by reducing the cycle of the irradiation with the laser beam L. Similarly, in the inner separation line formation step (S30), the third region in which defects are periodically formed and the interval between a pair of adjacent defects is the second interval may be formed by increasing the cycle of the irradiation with the laser beam L, and the fourth region in which defects are periodically formed and the interval between a pair of adjacent defects is shorter than the second interval may be formed by reducing the cycle of the irradiation with the laser beam L. In this case, the interval shorter than the first interval is preferably 70% or less of the first interval for the same reason as described above. Also, the interval shorter than the second interval is preferably 70% or less of the second interval for the same reason as described above. Moreover, for the same reason as in the embodiments above, it is preferable that the second region is constituted by a single portion on the circumference of the circle C1, and the fourth region is constituted by a single portion on the circumference of the circle C2. Also, it is preferable that the length of the second region is 12.5% or less of the length of the circumference of the circle C1, and the length of the fourth region is 12.5% or less of the length of the circumference of the circle C2.

In the embodiments above, the inner separation line formation step (S30) is performed after the first separation step (S20), but there is no limitation to this configuration. For example, the inner separation line formation step (S30) may be performed after the outer separation line formation step (S10) is performed and before the first separation step (S20) is performed, or the inner separation line formation step (S30) may be performed before the outer separation line formation step (S10) is performed. Also, the outer separation line L1 and the inner separation line L2 may be simultaneously formed by simultaneously performing the outer separation line formation step (S10) and the inner separation line formation step (S30). In this case, the irradiation with the laser beam L is performed along the circle C1 and the circle C2 at the same time.

In the embodiments above, in the outer separation line formation step (S10) and the inner separation line formation step (S30), the irradiation with the laser beam L is performed while the glass blank on the stage T is moved or rotated by moving or rotating the stage T at a constant speed with the laser beam L emitting position being fixed, but there is no limitation to this configuration. For example, the glass blank fixed on the stage T may be irradiated with the laser beam L while the laser beam L is moved by driving an optical system such as a micro mirror device provided in the laser beam source and optical system 30 to periodically deflect a pencil of rays.

In the embodiments above, in the outer separation line formation step (S10) and the inner separation line formation step (S30), a plurality of defects D are formed along the circles C1 and C2 in the counterclockwise direction, but a plurality of defects D may be formed along the circles C1 and C2 in the clockwise direction.

In the embodiments above, in the first separation step (S20) and the second separation step (S40), the heaters 40 are disposed outside the separation line, and the heaters 40 are not disposed inside the separation line, but there is no limitation to this configuration. Heaters may be disposed inside the separation line and heat a portion inside the separation line provided that a portion outside the separation line can be heated at a higher temperature than the portion inside the separation line to such a degree where separation is possible.

In the descriptions of the embodiments above, the glass substrate for a magnetic disc is used as an example of the glass substrate, but the present invention is not limited to the glass substrate for a magnetic disc, and the present invention can be applied to an annular glass substrate to be used for any purpose. For example, the present invention can also be applied to a disc-shaped glass substrate provided with no inner circumferential circle (circular hole), such as a substrate for a semiconductor. In this case, a method for manufacturing a disc-shaped glass substrate includes: forming, on a glass blank, a separation line that includes a plurality of defects along a predetermined circle by irradiating a surface of the glass blank with a laser beam along the predetermined circle; and separating a portion outside the separation line of the glass blank on which the separation line was formed from a portion inside the separation line by heating the portion outside the separation line at a higher temperature than the portion inside the separation line, wherein the separation line includes: a first region in which the defects are periodically formed and an interval between a pair of adjacent defects is a first interval; and a second region in which an interval between a pair of adjacent defects is a shorter interval than the first interval.

The invention claimed is:

1. A disc-shaped or annular glass substrate comprising:
two main surfaces; and
an outer circumferential edge surface that connects outer edges of the two main surfaces,
wherein the outer circumferential edge surface includes a first region and a second region in a circumferential direction of the disc-shaped or annular glass substrate, each of the first region and the second region is formed with a plurality of grooves extending in a thickness direction of the disc-shaped or annular glass substrate, in the first region, the grooves are periodically formed and an interval between a pair of adjacent grooves is a first interval, in the second region, an interval between a pair of adjacent grooves is shorter than the first interval, and in the second region, each interval between each of the grooves and another groove spaced two grooves apart therefrom is the first interval.

2. The disc-shaped or annular glass substrate according to claim 1, wherein a length of the second region is 12.5% or less of a length of the outer edge.

3. The disc-shaped or annular glass substrate according to claim 1, wherein the interval shorter than the first interval is 70% or less of the first interval.

4. A method for manufacturing a glass substrate for a magnetic disc, comprising at least processing for polishing the main surfaces of the disc-shaped or annular glass substrate according to claim 1.

5. The disc-shaped or annular glass substrate according to claim 2, wherein the interval shorter than the first interval is 70% or less of the first interval.

6. An annular glass substrate comprising:

two main surfaces;

an outer circumferential edge surface that connects outer edges of the two main surfaces;

an inner circumferential edge surface that is concentric with the outer circumferential edge surface and is formed inside the outer circumferential edge surface, wherein the outer circumferential edge surface includes a first region and a second region, each of the first region and the second region is formed with a plurality of grooves extending in a thickness direction of the disc-shaped or annular glass substrate, in the first region, the grooves are periodically formed and an interval between a pair of adjacent grooves is a first interval, in the second region, an interval between a pair of adjacent grooves is shorter than the first interval, the inner circumferential edge surface is provided with a plurality of grooves extending in the thickness direction of the annular glass substrate, a third region, and a fourth region, in the third region, the grooves are periodically formed and an interval between a pair of adjacent grooves is a second interval, and in the fourth region, an interval between a pair of adjacent grooves is shorter than the second interval.

7. The annular glass substrate according to claim 2, further comprising an inner circumferential edge surface that is concentric with the outer circumferential edge surface and is formed inside the outer circumferential edge surface, wherein the inner circumferential edge surface is provided with a plurality of grooves extending in the thickness direction of the annular glass substrate, a third region, and a fourth region, in the third region, the grooves are periodically formed and an interval between a pair of adjacent grooves is a second interval, in the fourth region, an interval between a pair of adjacent grooves is shorter than the second interval.

8. The annular glass substrate according to claim 3, further comprising an inner circumferential edge surface that is concentric with the outer circumferential edge surface and is formed inside the outer circumferential edge surface, wherein the inner circumferential edge surface is provided with a plurality of grooves extending in the thickness direction of the annular glass substrate, a third region, and a fourth region, in the third region, the grooves are periodically formed and an interval between a pair of adjacent grooves is a second interval, in the fourth region, an interval between a pair of adjacent grooves is shorter than the second interval.

9. The annular glass substrate according to claim 5, further comprising an inner circumferential edge surface that is concentric with the outer circumferential edge surface and is formed inside the outer circumferential edge surface, wherein the inner circumferential edge surface is provided with a plurality of grooves extending in the thickness direction of the annular glass substrate, a third region, and a fourth region, in the third region, the grooves are periodically formed and an interval between a pair of adjacent grooves is a second interval, in the fourth region, an interval between a pair of adjacent grooves is shorter than the second interval.

10. The annular glass substrate according to claim 6, wherein the second interval is shorter than the first interval.

11. The annular glass substrate according to claim 7, wherein the second interval is shorter than the first interval.

12. The annular glass substrate according to claim 8, wherein the second interval is shorter than the first interval.

13. The annular glass substrate according to claim 9, wherein the second interval is shorter than the first interval.

14. An annular glass substrate comprising:

two main surfaces;

an outer circumferential edge surface that connects outer edges of the two main surfaces; and an inner circumferential edge surface that is concentric with the outer circumferential edge surface, is formed inside the outer circumferential edge surface, and connects inner edges of the two main surfaces, wherein the inner circumferential edge surface includes a third region and a fourth region, each of the third region and the fourth region is formed with a plurality of grooves extending in a thickness direction of the annular glass substrate, in the third region, the grooves are periodically formed and an interval between a pair of adjacent grooves is a second interval, and in the fourth region, an interval between a pair of adjacent grooves is shorter than the second interval.

15. The annular glass substrate according to claim 14, wherein a length of the fourth region is 12.5% or less of a length of the inner edge.

16. The annular glass substrate according to claim 14, wherein the interval shorter than the second interval is 70% or less of the second interval.

17. The annular glass substrate according to claim 15, wherein the interval shorter than the second interval is 70% or less of the second interval.

18. A method for manufacturing a glass substrate for a magnetic disc, comprising at least processing for polishing the main surfaces of the annular glass substrate according to claim 14.

* * * * *